United States Patent
Zhu (10) Patent No.: US 11,882,078 B2
(45) Date of Patent: Jan. 23, 2024

(54) METHOD, DEVICE AND APPARATUS FOR DETERMINING CHANNEL DETECTION MECHANISM, AND STORAGE MEDIUM

(71) Applicant: BEIJING XIAOMI MOBILE SOFTWARE CO., LTD., Beijing (CN)

(72) Inventor: Yajun Zhu, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 369 days.

(21) Appl. No.: 17/476,762

(22) Filed: Sep. 16, 2021

(65) Prior Publication Data
US 2022/0006601 A1    Jan. 6, 2022

Related U.S. Application Data

(63) Continuation of application No. PCT/CN2019/078926, filed on Mar. 20, 2019.

(51) Int. Cl.
*H04L 5/00* (2006.01)
*H04B 17/382* (2015.01)
*H04W 72/0453* (2023.01)

(52) U.S. Cl.
CPC .......... *H04L 5/0098* (2013.01); *H04B 17/382* (2015.01); *H04L 5/003* (2013.01); *H04W 72/0453* (2013.01)

(58) Field of Classification Search
None
See application file for complete search history.

(56) References Cited

U.S. PATENT DOCUMENTS

| | | | |
|---|---|---|---|
| 2019/0230706 A1* | 7/2019 | Li | H04B 7/0639 |
| 2020/0107277 A1* | 4/2020 | Jeon | H04W 52/228 |
| 2020/0170008 A1* | 5/2020 | Sun | H04W 72/0453 |
| 2021/0410187 A1* | 12/2021 | Yang | H04W 74/0808 |

(Continued)

FOREIGN PATENT DOCUMENTS

| | | | |
|---|---|---|---|
| CN | 106658742 A | | 5/2017 |
| EP | 3399663 A1 | | 11/2018 |
| WO | WO 2018038777 A1 | | 3/2018 |

OTHER PUBLICATIONS

PCT/CN2019/078926 English translation of the International Search Report dated Dec. 25, 2019, 2 pages.

(Continued)

*Primary Examiner* — Yaotang Wang
(74) *Attorney, Agent, or Firm* — COZEN O'CONNOR (57) ABSTRACT

The present disclosure provides a method for determining a channel detection mechanism, a wireless communication device, and a storage medium. The method is applied to a scene where a broadband spectrum on an unlicensed spectrum is employed for transmission. The broadband spectrum includes multiple sub-bands. The method includes: determining a detection mode on the broadband spectrum; determining a channel detection mechanism corresponding to the broadband spectrum based on at least one sub-band in the multiple sub-bands in a case that the detection mode is a broadband detection mode; and determining a channel detection mechanism corresponding to each sub-band based on the sub-band in the multiple sub-bands in a case that the detection mode is a sub-band detection mode.

18 Claims, 4 Drawing Sheets

(56) References Cited

U.S. PATENT DOCUMENTS

2022/0166576 A1* 5/2022 Harada ............... H04L 27/0006
2022/0346147 A1* 10/2022 Wang ................ H04W 74/0866

OTHER PUBLICATIONS

Russian Patent Application No. 2021130267, Office Action dated May 27, 2022, 8 pages.
Russian Patent Application No. 2021130267, English translation of Office Action dated May 27, 2022, 6 pages.
European Patent Application No. 19920441.3, Search and Opinion dated Aug. 24, 2022, 9 pages.
Japanese Patent Application No. 2021-556305, Office Action dated Nov. 1, 2022, 4 pages.
Japanese Patent Application No. 2021-556305, English translation of Office Action dated Nov. 1, 2022, 4 pages.

* cited by examiner

METHOD, DEVICE AND APPARATUS FOR DETERMINING CHANNEL DETECTION MECHANISM, AND STORAGE MEDIUM

CROSS-REFERENCE TO RELATED APPLICATION

This application is a continuation of International Application No. PCT/CN2019/078926, filed on Mar. 20, 2019, the entire contents of which are incorporated herein by reference.

TECHNICAL FIELD

The disclosure relates to a field of communication technologies, and more particularly, to a method for determining a channel detection mechanism, a wireless communication device, and a storage medium.

BACKGROUND

It is proposed in the third generation partnership project (3GPP) that, unlicensed spectrum may be used by a mechanism of a license assisted access (LAA). That is, a licensed spectrum is employed to help implement a use on the unlicensed spectrum.

A channel detection mechanism is introduced into the LAA. That is, a base station needs to detect whether a channel is in an idle state before transmitting data, and data may be transmitted only when the channel is in the idle state.

There are multiple forms of channel detection mechanisms. If a spectrum used by a communication system is broadband and the broadband includes multiple sub-bands, no solution is currently available as to how to select a reasonable channel detection mechanism.

SUMMARY

Embodiments of the disclosure provide a method for determining a channel detection mechanism, a wireless communication device, and a storage medium.

Embodiments of the present disclosure provide a method for determining a channel detection mechanism. The method is applied to a scene where a broadband spectrum on an unlicensed spectrum is employed for transmission. The broadband spectrum includes multiple sub-bands. The method includes: determining a detection mode on the broadband spectrum; determining a channel detection mechanism corresponding to the broadband spectrum based on at least one sub-band in the multiple sub-bands in a case that the detection mode is a broadband detection mode; and determining a channel detection mechanism corresponding to each sub-band based on the sub-band in the multiple sub-bands in a case that the detection mode is a sub-band detection mode.

Embodiments of the present disclosure provide a wireless communication device. The wireless communication device includes a processor, a transceiver, and a memory. The transceiver is coupled to the processor. The memory is configured to store instructions executable by the processor. The processor is configured to load and execute the instructions to: determine a detection mode on the broadband spectrum; determine a channel detection mechanism corresponding to the broadband spectrum based on at least one sub-band in the plurality of sub-bands in a case that the detection mode is a broadband detection mode; and determine a channel detection mechanism corresponding to each sub-band based on the sub-band in the plurality of sub-bands in a case that the detection mode is a sub-band detection mode.

Embodiments of the present disclosure provide a computer readable storage medium having at least one instruction, at least one program, a code set or an instruction set stored thereon. The at least one instruction, the at least one program, the code set or the instruction set is loaded and executed by a processor to implement a method for determining a channel detection mechanism. The method is applied to a scene where a broadband spectrum on an unlicensed spectrum is employed for transmission. The broadband spectrum includes multiple sub-bands. The method includes: determining a detection mode on the broadband spectrum; determining a channel detection mechanism corresponding to the broadband spectrum based on at least one sub-band in the multiple sub-bands in a case that the detection mode is a broadband detection mode; and determining a channel detection mechanism corresponding to each sub-band based on the sub-band in the multiple sub-bands in a case that the detection mode is a sub-band detection mode.

BRIEF DESCRIPTION OF THE DRAWINGS

In order to explain the technical solution in embodiments of the disclosure more clearly, introduction will be briefly made below to accompanying drawings used in the description of the embodiments. The accompanying drawings in the following description are only some embodiments of the disclosure, and other accompanying drawings may be obtained according to these accompanying drawings without paying any creative labor.

DETAILED DESCRIPTION

In order to ensure coexistence with other wireless systems in an unlicensed spectrum, such as WiFi, a mechanism for channel detection is also introduced in an LAA before data transmission. Before describing embodiments of the disclosure, a channel detection mechanism involved in the disclosure is briefly introduced.

There may be five types of channel detection mechanisms.

The first type (Cat.1) is a mechanism without an LBT (Listen before talk), that is, a wireless communication device does not need to perform channel detection before transmitting information, but directly sends information. The LBT may also be called a listening avoidance mechanism, which is used to realize an effective sharing of an unlicensed spectrum. The LBT requires listening to a channel and performing clear channel assessment (CCA) before transmitting information, and then performs transmission when the channel is idle.

The second type (LBT Cat.2) is an LBT mechanism without random backoff process. The wireless communication device only needs to detect a time granularity before transmitting information. For example, the time granularity may be 25 us. In a case that the channel is idle within the time granularity, the wireless communication device may transmit information; otherwise, LBT execution fails, and the wireless communication device may not transmit information.

Figure 1:
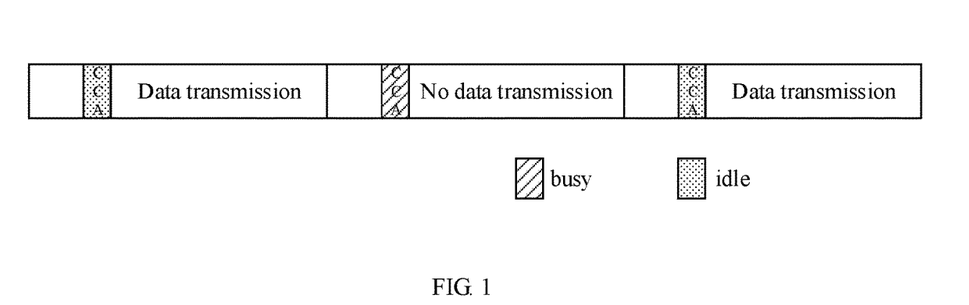
FIG. 1 is a schematic diagram illustrating channel listening of LBT Cat.2 involved in the present disclosure.

Referring to FIG. 1 schematically, the wireless communication device performs CCA listening in a single time slot. In a case that a listening result of a channel in a first CCA time slot and a third CCA time slot is in an idle state, the wireless communication device may occupy the channel for data transmission. In a case that a listening result of the channel in a second CCA time slot is in a busy state, the wireless communication device may not occupy the channel for data transmission, which is referred to as no data transmission.

The third type (LBT cat.3) is a random backoff LBT mechanism with a fixed CWS (contention window size). A transmitting device first detects whether the channel is idle at the first time granularity. In a case that it is detected that the channel is idle, a random number N is selected in a first contention window, and channel detection is performed with a second time granularity as the time granularity. In a case that it is detected that the channel is idle at the second time granularity and that the random number is not 0, the random number is reduced by 1, and the channel detection is performed continuously with the second time granularity as the time granularity. In a case that it is detected that the channel is busy at the second time granularity, the channel detection is performed again with the first time granularity as the time granularity. In a case that it is detected that the channel is idle again at the first time granularity and that the random number is not 0, the random number is reduced by 1, and the channel detection is resumed with the second time granularity as the time granularity. It represents that the channel is idle until the random number is reduced to 0.

The fourth type (LBT Cat.4) is a random backoff LBT mechanism with a variable CWS. That is, on the basis of the LBT Cat.3, the transmitting device may adjust the CWS based on a result of a previous transmission. For example, for data transmitted within a reference period in the previous transmission, a proportion of data not correctly received is X, and when X is greater than a threshold, the CWS increases. In order to refine parameter setting in an LBT process, four priorities are set in the LBT Cat.4. Each priority corresponds to different parameter configurations, and data transmission of different service types corresponds to different priorities.

A principle of the LBT Cat.4 includes the following. First, the wireless communication device detects whether the channel is idle at the first time granularity. In a case that it is detected that the channel is idle, the value N of a backoff counter (also called random number) is selected in the first contention window, and channel detection is performed with the second time granularity as the time granularity. In a case that it is detected that the channel is idle at the second time granularity and that the value of the backoff counter is not 0, the value of the backoff counter is reduced by 1, and the channel detection is performed continuously at the second time granularity. In a case that it is detected that the channel is busy at the second time granularity, channel detection is performed again with the first time granularity as the time granularity. In a case that it is detected that the channel is idle again at the first time granularity and that the value of the backoff counter is not 0, the value of the backoff counter is reduced by 1, and the channel detection is resumed with the second time granularity as the time granularity. Until the value of the backoff counter is reduced to 0, it means that the channel may be occupied.

Figure 2:
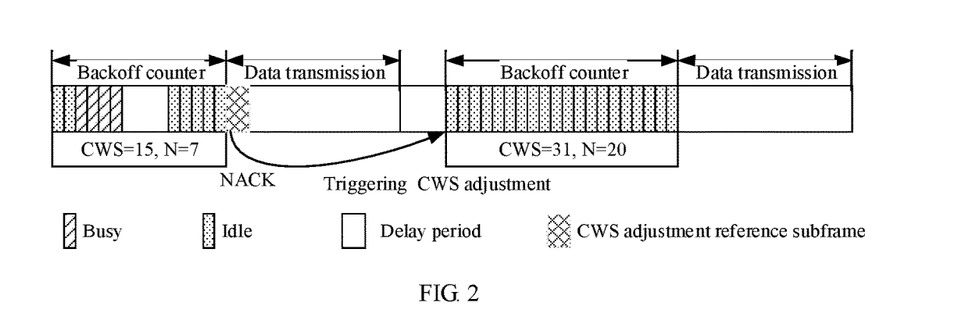
FIG. 2 is a schematic diagram illustrating channel listening of LBT Cat.4 involved in the present disclosure.

Referring schematically to FIG. 2, the wireless communication device generates a backoff counter N uniformly and randomly from 0 to the CWS, and performs listening with a granularity of a CCA slot. Taking CWS=15 and N=7 corresponding to a first transmission of a physical downlink shared channel (PDSCH) as an example, in first and second listening time slots, a listening result of a channel is in the idle state, and N decreases to 5. In third to sixth listening time slots, a listening result of the channel is in the busy state, N remains unchanged. Listening is restarted after delaying 4 listening time slots. In eleventh to fifteenth listening time slots, a listening result of the channel is in the idle state, N decreases to 0, and the wireless communication device starts to occupy the channel for data transmission.

In a case that the wireless communication device receives a negative feedback (NACK) during data transmission, it means that the data transmission fails. The wireless communication device dynamically raises the CWS to 31 based on the erroneous reception state, regenerates the value N of the backoff counter to 20, and employs the raised CWS and the value N of the backoff counter to perform channel listening before a second PDSCH transmission. In addition, when a listening result of a channel in 20 consecutive listening time slots is in the idle state, the channel is occupied for data transmission.

Different contention window sizes (CWS) correspond to different channel access priorities p. In a schematic example, Table-1 illustrates four priority parameter configurations for downlink LBT Cat.4, and Table-2 illustrates four priority parameter configurations for uplink LBT Cat.4, which are slightly different on values.

TABLE 1

| Channel access priorities (p) | $m_p$ | $CW_{min,p}$ | $CW_{max,p}$ | $T_{mcot,p}$ | Optional values of $CW_p$ |
|---|---|---|---|---|---|
| 1 | 1 | 3 | 7 | 2 ms | {3, 7} |
| 2 | 1 | 7 | 15 | 3 ms | {7, 15} |
| 3 | 3 | 15 | 63 | 8 or 10 ms | {15, 31, 63} |
| 4 | 7 | 15 | 1023 | 8 or 10 ms | {15, 31, 63, 127, 255, 511, 1023} |

TABLE 2

| Channel access priorities (p) | $m_p$ | $CW_{min,p}$ | $CW_{max,p}$ | $T_{mcot,p}$ | Optional values of $CW_p$ |
|---|---|---|---|---|---|
| 1 | 2 | 3 | 7 | 2 ms | {3, 7} |
| 2 | 2 | 7 | 15 | 3 ms | {7, 15} |
| 3 | 3 | 15 | 1023 | 6 or 10 ms | {15, 31, 63, 127, 255, 511, 1023} |
| 4 | 7 | 15 | 1023 | 6 or 10 ms | {15, 31, 63, 127, 255, 511, 1023} |

Among the four channel access priorities respectively illustrated in Table-1 and Table-2 above, the smaller the p value, the higher the corresponding channel access priority. $m_p$ represents the number of extended clear channel evaluations (ECCAs) included in a delay period, and each delay period is composed of a fixed 16 us duration and $m_p$ ECCAs, that is, the first time granularity introduced above. $CW_{min,p}$ represents a minimum contention window size, and $CW_{max,p}$ represents a maximum contention window size. The CWS is generated between these two sizes during the LBT, and then the backoff counter N randomly generated from 0 to the generated contention window $CW_p$ determines a backoff period during the LBT channel detection. $T_{mcot,p}$ represents a maximum period that the channel is occupied after successful execution of the LBT Cat.4 corresponding to each priority. It may be seen from the above tables that, comparing with priorities 1 and 2, LBT processes with priorities 3 and 4 have a long execution period and a low chance of obtaining a channel access. In order to ensure fairness, data transmission using the two priorities occupies a relatively long maximum transmission period.

The fifth type is a channel detection mechanism based on a frame structure, i.e., an FBE (frame based equipment). For the FBE, a period is set, and channel detection is performed one time at a fixed position of each period. For example, CCA detection is performed within each CCA detection period. In a case that it is detected that the channel state is idle, the channel may be occupied for data transmission, and the maximum channel occupation period is fixed, and CCA detection is performed again when a CCA detection time point of a following cycle is reached. In a case that it is detected that the channel is non-idle, the wireless communication device may not occupy the channel in the cycle and continues to perform detection until waiting a fixed position in the following cycle. The fixed period refers to a time domain unit scheduled by the FBE. For example, the fixed period may be an FFP (fixed frame period). A length of the fixed period may be predetermined by a protocol.

It should be noted that, the above five channel detection mechanisms are merely exemplary introductions. With the evolution of communication technologies, the above five channel detection mechanisms may change, or a new channel detection mechanism be generated, but all the channel detection mechanisms are all applicable to the technical solution described in the disclosure.

A network architecture and a service scene described in embodiments of the disclosure are for the purpose of more clearly describing a technical solution provided by embodiments of the disclosure, and do not constitute a limitation on the technical solution provided by embodiments of the disclosure. It may be known by the skilled in the art that, with the evolution of the network architecture and the emergence of a new service scene, the technical solution provided by embodiments of the disclosure is equally applicable to a similar technical problem.

Figure 3:
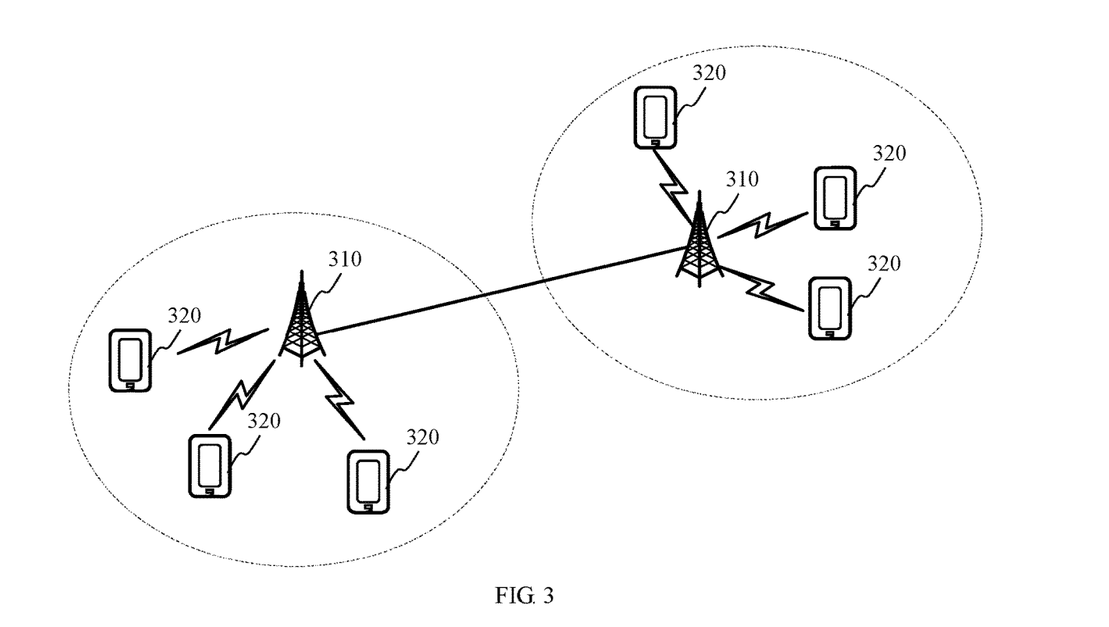
FIG. 3 is a schematic diagram illustrating a wireless communication system according to an exemplary embodiment of the disclosure.

FIG. 3 is a schematic diagram illustrating a wireless communication system according to an exemplary embodiment of the disclosure. The wireless communication system may include a base station 310 and a terminal 320.

The base station 310 is deployed in an access network. The access network in a 5G NR system may be called a new generation-radio access network (NG-RAN). The base station 310 and the terminal 320 may communicate with each other via some air interface technologies, such as cellular technologies.

The base station 310 is a device deployed in the access network and configured to provide a wireless communication function for the terminal 320. The base station 310 may include various forms of macro base stations, micro base stations, relay stations, access points and the like. In a system with different wireless access technologies, devices with a base station function may have different names. For example, in the 5G NR system, the device is called gNodeB or gNB. With the evolution of communication technologies, the name of "base station" may change. For convenience of description, in embodiments of the disclosure, the above devices for providing the wireless communication function for the terminal 320 are collectively referred to as base station. In other embodiments, the base station 310 may also become an access network device.

There are generally multiple terminals 320, and one or more terminals 320 may be distributed in a cell managed by each base station 310. The terminal 320 may include various handheld devices with the wireless communication function, vehicle-mounted devices, wearable devices, computing devices or other processing devices connected to a wireless modem, as well as various forms of user equipments (UE), mobile stations (MS), terminal devices and the like. For convenience of description, in embodiments of the disclosure, the above devices are collectively referred to as terminal.

The "5G NR system" in embodiments of the disclosure may also be called 5G system or NR system, which may be understood by the skilled in the art. The technical solution described in embodiments of the disclosure may be applied to the 5G NR system, and may also be applied to a subsequent evolution system of the 5G NR system. The 5G NR system may be used in an LAA scene.

Figure 4:
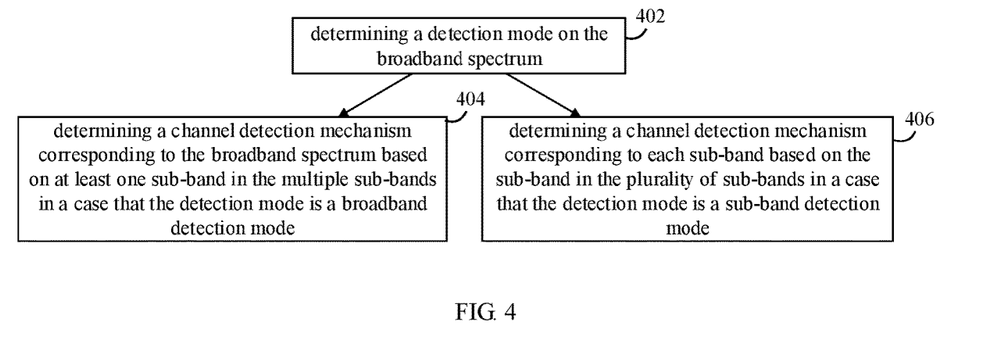
FIG. 4 is a flow chart illustrating a method for determining a channel detection mechanism according to an exemplary embodiment of the disclosure.

FIG. 4 is a flow chart illustrating a method for determining a channel detection mechanism according to an exemplary embodiment of the disclosure. The method may be executed by the base station 310 or the terminal 320 illustrated in FIG. 3, and may be applied to a scene where a broadband spectrum on an unlicensed spectrum is employed for transmission. The method includes following.

At block 402, a detection mode on the broadband spectrum is determined.

Figure 5:
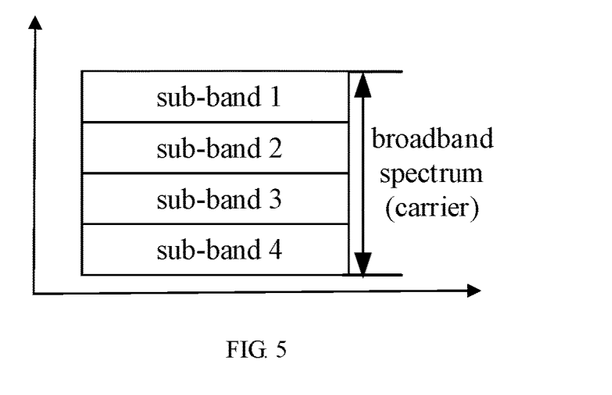
FIG. 5 is a schematic diagram illustrating a relationship between a broadband spectrum and a sub-band according to an exemplary embodiment of the disclosure.

The broadband spectrum is a spectrum on the unlicensed spectrum. In a conventional LAA system, a maximum bandwidth of a carrier is 20 MHz, but in a subsequent communication system, a carrier may occupy a large bandwidth, such as 100 MHz. In this case, the carrier with the large bandwidth may be divided into multiple bandwidth parts to save power consumption of the terminal. According to the disclosure, the carrier with the large bandwidth is called broadband spectrum. One broadband spectrum is divided into at least two sub-bands, and each sub-band is independent of each other. FIG. 5 illustrates a broadband spectrum including four sub-bands.

In certain embodiments, each sub-band may also be called one channel detection unit. A channel detection mechanism corresponding to each channel detection unit may be pre-determined or pre-configured for the channel detection unit. In embodiments of the disclosure, the pre-determined process is implemented by a communication protocol, and the pre-configured process is implemented by the base station to the terminal.

Alternatively, multiple sub-bands in the broadband spectrum are continuous in the frequency domain, but a possibility that the multiple sub-bands are discontinuous in the spectrum is not excluded.

Since at least two sub-bands exist in the broadband spectrum, there are two detection modes for the broadband spectrum, which are a broadband detection mode and a sub-band detection mode.

The broadband detection mode refers to a detection mode in which the multiple sub-bands are regarded as a whole when a channel detection mechanism is employed for channel listening, that is, a same channel detection mechanism is used in the broadband spectrum. The sub-band detection mode refers to a detection mode in which each sub-band is regarded as a separate channel detection unit and each sub-band uses a channel detection mechanism of the sub-band for channel listening.

At block 404, a channel detection mechanism corresponding to the broadband spectrum is determined based on at least one sub-band in the multiple sub-bands in a case that the detection mode is the broadband detection mode.

The terminal determines the channel detection mechanism corresponding to the broadband spectrum based on a target sub-bands in the multiple sub-bands. The target sub-band may be one or more sub-bands. In this embodiment, that the target sub-band is one sub-band is taken as an example for illustration.

Each channel detection unit is pre-defined or pre-configured with the channel detection mechanism corresponding to the channel detection unit. Taking the channel detection mechanism including the LBT Cat.4 under different channel access priorities as an example, the channel detection mechanism corresponding to the target sub-band is a sub-band with a lowest channel access priority. In some embodiments, the channel detection mechanism corresponding to the target sub-band is a sub-band with a highest channel access priority, which is not limited by the disclosure At block 406, a channel detection mechanism corresponding to each sub-band is determined based on the sub-band in the multiple sub-bands in a case that the detection mode is the sub-band detection mode.

In the sub-band detection mode, the channel detection mechanisms used by respective sub-bands may be independent. The channel detection mechanisms used by respective sub-bands may be the same as or different from each other.

For example, there are different types of channel detection mechanisms employed by at least two sub-bands. As schematically illustrated in FIG. 5, the LBT Cat.2 is employed for a sub-band 1, and the LBT Cat.4 with CWS=16 is employed for a sub-band 2. For another example, there are different parameters of the channel detection mechanism used by the at least two sub-bands. As schematically illustrated in FIG. 5, the LBT Cat.4 with CWS=16 is employed for the sub-band 2 and the LBT Cat.4 with CWS=32 is employed for the sub-band 3.

In conclusion, with the method provided in this embodiment, the detection mode on the broadband spectrum is determined. The channel detection mechanism corresponding to the broadband spectrum are determined based on the at least one sub-band in the multiple sub-bands in the case that the detection mode is the broadband detection mode. The channel detection mechanism corresponding to each sub-band is determined based on the sub-band in the multiple sub-bands in the case that the detection mode is the sub-band detection mode. Based on different detection modes, a more reasonable channel detection mechanism may be determined by adopting different determination methods, thereby realizing fair occupation of channel resources with other wireless communication systems in the unauthorized spectrum.

In multiple embodiments of the disclosure, since the channel detection mechanism employed in the broadband spectrum is likely to be the LBT Cat.4, "determining the channel detection mechanism" includes determining the CWS used by the channel detection mechanism.

However, based on the same principle, determining the channel detection mechanism may also include: such as determining which of the above five LBT modes is the type of the employed channel detection mechanism, or determining each detailed parameter employed in the channel detection mechanism when the employed channel detection mechanism is a target type, which is not limited by the disclosure.

Figure 6:
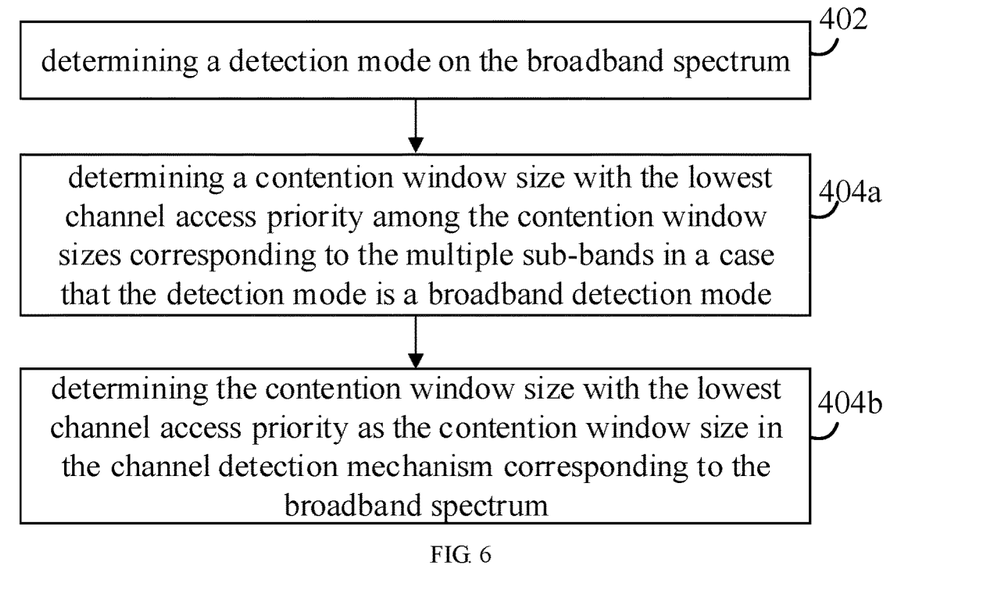
FIG. 6 is a flow chart illustrating a method for determining a channel detection mechanism according to another exemplary embodiment of the disclosure.

In an alternative embodiment based on FIG. 4, taking the LBT Cat.4 as an example, each sub-band is predefined or preconfigured with a CWS, and different CWS correspond to different channel access priorities. For example, the channel detection mechanism corresponding to each sub-band is illustrated in a row of parameters in Table 1 or Table 2 above. The action at block 404 may be implemented as following actions, as illustrated in FIG. 6.

At block 404*a*, in the case that the detection mode is the broadband detection mode, the contention window size with the lowest channel access priority is determined among the contention window sizes corresponding to the multiple sub-bands.

Exemplarily, each sub-band corresponds to its own CWS, and different CWS correspond to different channel access priorities.

For broadband transmission including the multiple sub-bands (when the broadband detection mode is employed), the CWS with the lowest channel access priority is determined based on the CWSs corresponding to the multiple sub-bands. The channel access priority is low, which means that there are longer or more listening time slots in a channel listening process, but the corresponding obtained channel occupation period may also become long.

At block 404*b*, the contention window size with the lowest channel access priority is determined as the contention window size in the channel detection mechanism corresponding to the broadband spectrum.

Figure 7:
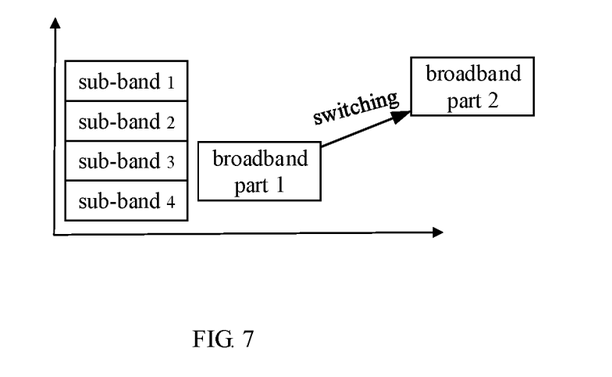
FIG. 7 is a schematic diagram illustrating an exemplary example of a method for determining a channel detection mechanism according to the embodiment illustrated in FIG. 6.

In combination with a schematic example illustrated in FIG. 7, a bandwidth part (BWP) activated on the terminal is switched from a BWP1 to a BWP2, where the BWP1 includes the sub-band 3 and the BWP2 includes the sub-band 2 and the sub-band 3. It is assumed that CWS=16 corresponds to the sub-band 2 and CWS=32 corresponds to the sub-band 3, and a channel access priority corresponding to the CWS=32 is lower than that corresponding to the CWS=16. When the detection mode is the broadband detection mode, the CWS used by the terminal on the BWP2 is 32. That is, the terminal determines the channel detection mechanism on the whole BWP2 based on the channel detection mechanism used by the sub-band 3.

In conclusion, with the method provided by this embodiment, in the case that the detection mode is the broadband detection mode, the channel detection mechanism corresponding to the target sub-band with the lowest channel access priority is employed to determine the channel detection mechanism employed in the whole broadband spectrum, which may effectively enable the wireless communication device to accurately determine a reasonable channel detection mechanism, thereby occupying the channel resources fairly with other communication systems in the unlicensed spectrum.

Figure 8:
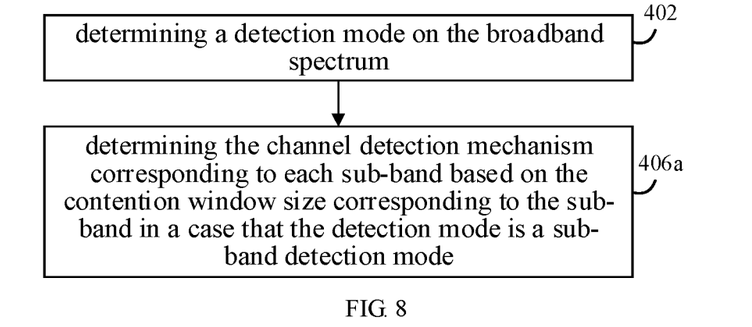
FIG. 8 is a flow chart illustrating a method for determining a channel detection mechanism according to another exemplary embodiment of the disclosure.

In an alternative embodiment based on FIG. 4, taking that each sub-band employs the LBT Cat.4 as an example, each sub-band is predefined or preconfigured with a CWS. The action at block 404 may be implemented as following actions, as illustrated in FIG. 8.

At block 406a, in the case that the detection mode is the sub-band detection mode, the channel detection mechanism corresponding to each sub-band is determined based on a contention window size corresponding to the sub-band.

For broadband transmission including the multiple sub-bands (when the sub-band detection mode is employed), the channel detection mechanism employed by the sub-band is determined based on the CWS corresponding to each sub-band. That is, respective sub-bands are independent of each other, and respective sub-bands employ the same or different channel detection mechanisms. Alternatively, channel detection mechanisms employed by at least two sub-bands are different.

In combination with the schematic example illustrated in FIG. 7, a bandwidth part (BWP) activated on the terminal is switched from a BWP1 to a BWP2. The BWP1 includes a sub-band 3, and the BWP2 includes a sub-band 2 and the sub-band 3. It is assumed that CWS=16 corresponds to the sub-band 2 and CWS=32 corresponds to the sub-band 3, and a channel access priority corresponding to the CWS=32 is lower than that corresponding to the CWS=16. When the detection mode is the sub-band detection mode, the terminal employs a LBT Cat.4 with CWS=16 in the sub-band 2, and employs a LBT Cat.4 with CWS=32 in the sub-band 3.

In conclusion, with the method provided in this embodiment, when the sub-band detection mode is employed, the channel detection mechanism corresponding to each sub-band is adopted to determine the channel detection mechanism employed in the whole broadband spectrum, such that the wireless communication device may accurately determine a reasonable channel detection mechanism, thereby occupying the channel resources fairly with other communication systems in the unlicensed spectrum.

Figure 9:
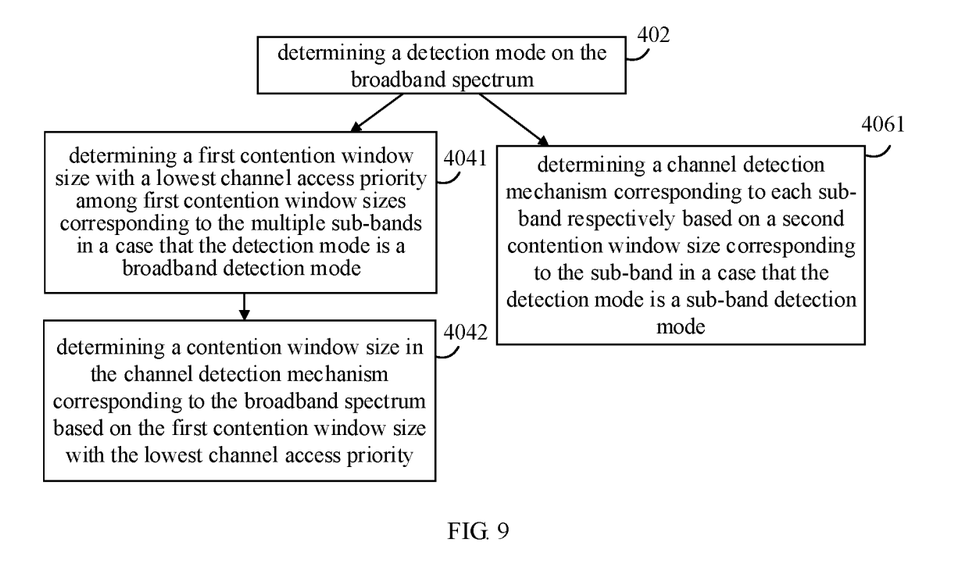
FIG. 9 is a flow chart illustrating a method for determining a channel detection mechanism according to another exemplary embodiment of the disclosure.

In an alternative embodiment based on FIG. 4, taking that each sub-band employs the LBT Cat.4 as an example, each sub-band is predefined or preconfigured with two CWSs, i.e., a first CWS and a second CWS. The first CWS is a CWS for the broadband detection mode, and the second CWS is a contention window size for the sub-band detection mode. Different first CWSs also correspond to different channel access priorities. The action at blocks 404 and 406 may be implemented as following actions, as illustrated in FIG. 9.

At block 4041, a first CWS with a lowest channel access priority is determined among first CWSs corresponding to the multiple sub-bands in the case that the detection mode is the broadband detection mode.

At block 4042, a CWS in the channel detection mechanism corresponding to the broadband spectrum is determined based on the first CWS with the lowest channel access priority.

At block 4061, the channel detection mechanism corresponding to each sub-band is determined based on a second CWS corresponding to each sub-band in the case that the detection mode is sub-band detection mode.

Figure 10:
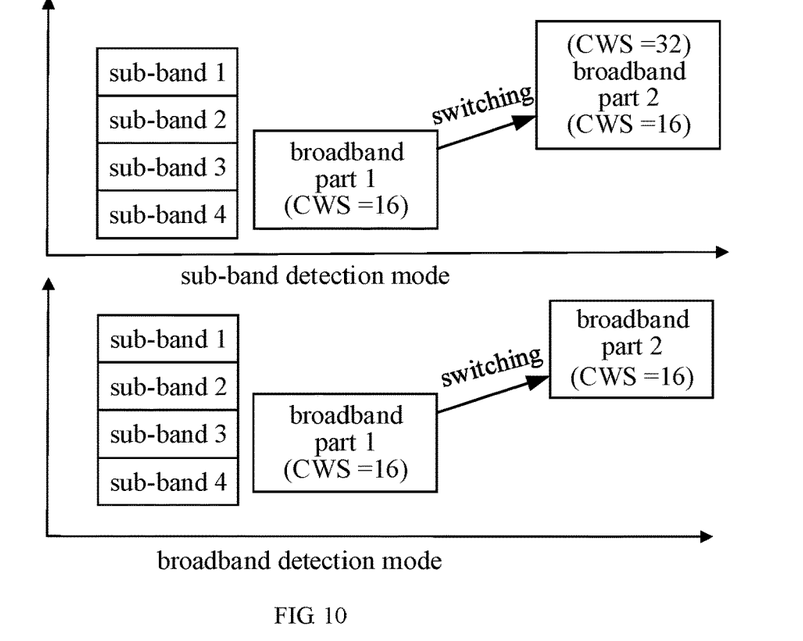
FIG. 10 is a schematic diagram illustrating an exemplary example of a method for determining a channel detection mechanism according to the embodiment illustrated in FIG. 9.

In the schematic example illustrated in FIG. 10, the CWS corresponding to the sub-band 3 is {8,16}, where 8 represents the first CWS based on the broadband detection mode, and 16 represents the second CWS based on the sub-band detection mode. A CWS on a sub-band 2 is {16, 32}, where 16 represents the first CWS based on the broadband detection mode, and 32 represents the second CWS based on the sub-band detection mode. Then, after an activated BWP is switched from a BWP1 to a BWP2, in a case that a detection mode on the BWP2 is the sub-band detection mode, a CWS of the sub-band 3 on the BWP2 is adjusted based on 16, and a CWS on the sub-band 2 is adjusted based on 32. In a case that a detection mode on the BWP2 is the broadband detection mode, since the first CWS of the sub-band 2 is 8 and the first CWS of the sub-band 3 is 16, the CWS for broadband detection on the BWP 2 is adjusted based on 16.

In an alternative embodiment based on the above embodiments, the method is performed by the base station, and then the base station determines the detection mode of the broadband spectrum by the base station at block 402. That is, the base station autonomously determines whether to use the broadband detection mode or the sub-band detection mode for the broadband spectrum.

In an alternative embodiment based on the above embodiments, the method is performed by the terminal, then the terminal determines the detection mode of the broadband spectrum by itself at block 402, or after the base station determines the detection mode of the broadband spectrum, the base station sends a first BWP switch command to the terminal. The first BWP switch command carries the channel detection mechanism on the broadband spectrum. The terminal receives the first BWP switch command and determines the detection mode on the broadband spectrum based on the first BWP switch command.

In an alternative embodiment based on the above embodiments, the method is performed by the base station. After the base station determines the channel detection mechanism on the broadband spectrum, the base station generates a second BWP switch command for indicating the channel detection mechanism on the broadband spectrum, and sends the second BWP switch command to the terminal. The terminal receives the second BWP switch command. The terminal determines the channel detection mechanism on the broadband spectrum based on the second BWP switch command.

Alternatively, the second BWP switch command carries a type and a parameter of the channel detection mechanism. The second BWP switch command may also carry an indicator bit. The indication bit is employed to indicate the type and the parameter of the channel detection mechanism. A correspondence among the indicator bit, the type of the channel detection mechanism and the parameter of the channel detection mechanism is stored in the base station and the terminal.

The following is an apparatus embodiment provided by the disclosure. The apparatus corresponds to the above method embodiment. The technical details not described in detail in the apparatus embodiment may be referred to the above method embodiment, which will not be elaborated.

Figure 11:
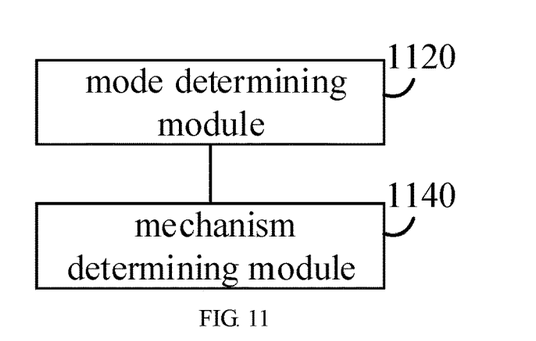
FIG. 11 is a structure diagram illustrating an apparatus for determining a channel detection mechanism according to an exemplary embodiment of the disclosure.

FIG. 11 is a block diagram illustrating an apparatus for determining a channel detection mechanism according to an exemplary embodiment of the disclosure. The apparatus may be implemented as a part of a wireless communication device. The apparatus is applied to a scene where a broadband spectrum on an unlicensed spectrum is employed for transmission, and the broadband spectrum includes multiple sub-bands. The apparatus includes a mode determining module 1120, and a mechanism determining module 1140. The mode determining module 1120 is configured to determine a detection mode on the broadband spectrum. The mechanism determining module 1140 is configured to determine a channel detection mechanism corresponding to the broadband spectrum based on at least one sub-band in the multiple sub-bands in a case that the detection mode is a broadband detection mode. The mechanism determining module 1140 is configured to determine a channel detection mechanism corresponding to each sub-band based on the sub-band in the multiple sub-bands in a case that the detection mode is a sub-band detection mode.

In an alternative embodiment, the channel detection mechanism includes a contention window size, and different contention window sizes correspond to different channel access priorities. The mode determining module 1120 is configured to: determine a contention window size with a lowest channel access priority among the contention window sizes corresponding to the multiple sub-bands; and determine the contention window size with the lowest channel access priority as the contention window size in the channel detection mechanism corresponding to the broadband spectrum.

In an alternative embodiment, the channel detection mechanism includes a contention window size. The mechanism determining module 1140 is configured to determine the channel detection mechanism corresponding to each sub-band based on the contention window size corresponding to the sub-band.

In an alternative embodiment, each sub-band corresponds to a first contention window size and a second contention window size. The first contention window size is a contention window size for a broadband detection mode. The second contention window size is a contention window size for a sub-band detection mode.

In an alternative embodiment, the apparatus is applied to a terminal or a base station. The mechanism determining module is configured to determine a detection mode on a broadband spectrum automatically.

In an alternative embodiment, the apparatus is applied to the terminal. The apparatus also includes a receiving module. The receiving module is configured to receive a first BWP (bandwidth part) switch command, and the mechanism determining module is configured to determine the detection mode on the broadband spectrum based on the first BWP switch command.

In an alternative embodiment, the apparatus is applied to the base station. The apparatus also includes a sending module. The mechanism determining module 1140 is configured to generate a second BWP switch command. The second BWP switch command is used to indicate the channel detection mechanism on the broadband spectrum. The sending module is configured to send the second BWP switch command to a terminal.

Figure 12:
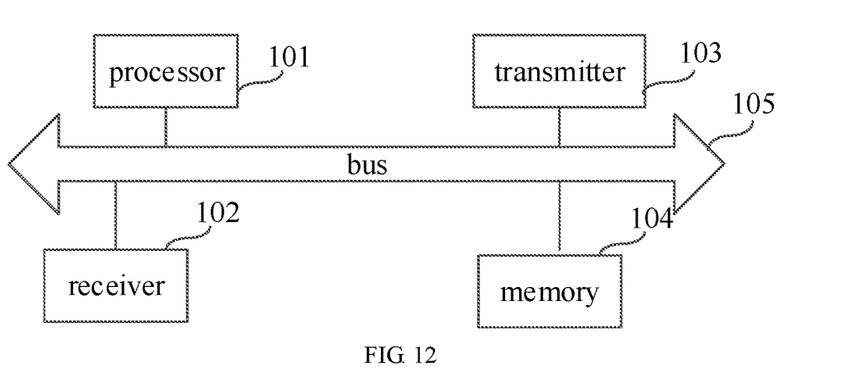
FIG. 12 is a structure diagram illustrating a wireless communication device according to another exemplary embodiment of the disclosure.

FIG. 12 is a block diagram illustrating a wireless communication device according to another exemplary embodiment of the disclosure. The wireless communication device may be a terminal or a base station. The wireless communication device includes a processor 101, a receiver 102, a transmitter 103, a memory 104 and a bus 105.

The processor 101 includes one or more processing cores. The processor 101 is configure to execute various functional applications and information processing by operating software programs and modules.

The receiver 102 and the transmitter 103 may be implemented as a communication component. The communication component may be a communication chip.

The memory 104 is connected to the processor 101 via a bus 105.

The memory 104 may be configured to store at least one instruction. The processor 101 is configured to execute the at least one instruction to implement each action in the above method embodiment.

In addition, the memory 104 may be implemented by any type of volatile or nonvolatile memory device or a combination thereof. The volatile or nonvolatile memory device includes, but not limited to, a magnetic disk or optical disk, an electrically erasable programmable read-only memory (EEPROM), an erasable programmable read-only memory (EPROM), a static random access memory (SRAM), a read-only memory (ROM), a magnetic memory, a flash memory, a programmable read-only memory (PROM)

In an exemplary embodiment, there is also provided a non-transitory computer-readable storage medium including instructions, such as a memory including instructions. The instructions may be executed by a processor to implement the action in the above method embodiments. For example, the non-transitory computer-readable storage medium may be a ROM, a random access memory (RAM), a compact disc read-only memory (CD-ROM), a magnetic tape, a floppy disk and an optical data storage device.

The non-transitory computer-readable storage medium enables the processor to execute the above method for determining the channel detection mechanism when the instructions in the non-transitory computer storage medium are executed by the processor.

The above numerals of embodiments of the disclosure are only for description, and do not represent the advantages and disadvantages of the embodiments.

The skilled in the art may understand that all or part of the actions of the above embodiments may be implemented by hardware, or by related hardware instructed by a program. The program may be stored in a computer readable storage medium, such as the read-only memory, the magnetic disk or the optical disk mentioned above.

The above is only a preferred embodiment of the disclosure, and is not used to limit the disclosure. Any modification, equivalent substitution, improvement, and the like made within the spirit and principle of the disclosure shall be included in the protection scope of the disclosure.

What is claimed is:

1. A method for determining a channel detection mechanism, applied to a scene where a broadband spectrum on an unlicensed spectrum is employed for transmission, wherein the broadband spectrum comprises a plurality of sub-bands, the method comprising:

determining a detection mode on the broadband spectrum;

determining a channel detection mechanism corresponding to the broadband spectrum based on at least one sub-band in the plurality of sub-bands in a case that the detection mode is a broadband detection mode; and determining a channel detection mechanism corresponding to each sub-band based on the sub-band in the plurality of sub-bands in a case that the detection mode is a sub-band detection mode.

2. The method of claim 1, wherein the channel detection mechanism comprises a contention window size, and different contention window sizes correspond to different channel access priorities; and
wherein determining the channel detection mechanism corresponding to the broadband spectrum based on the at least one sub-band in the plurality of sub-bands comprises:
determining a contention window size with a lowest channel access priority among the contention window sizes corresponding to the plurality of sub-bands; and
determining the contention window size with the lowest channel access priority as a contention window size in the channel detection mechanism corresponding to the broadband spectrum.

3. The method of claim 1, wherein the channel detection mechanism comprises a contention window size, and
wherein determining the channel detection mechanism corresponding to each sub-band based on the sub-band in the plurality of sub-bands comprises:
determining the channel detection mechanism corresponding to each sub-band based on a contention window size corresponding to the sub-band.

4. The method of claim 1, wherein each sub-band corresponds to a first contention window size and a second contention window size,
the first contention window size is a contention window size for a broadband detection mode; and
the second contention window size is a contention window size for a sub-band detection mode.

5. The method of claim 1, wherein determining the detection mode on the broadband spectrum comprises:
determining the detection mode on the broadband spectrum automatically; or
receiving a first bandwidth part (BWP) switch command, and determining the detection mode on the broadband spectrum based on the first BWP switch command.

6. The method of claim 1, further comprising:
generating a second bandwidth part (BWP) switch command, the second BWP switch command being configured to indicate the channel detection mechanism on the broadband spectrum; and
sending the second BWP switch command to a terminal.

7. A wireless communication device, comprising:
a processor;
a transceiver, coupled to the processor; and
a memory, configured to store instructions executable by the processor,
wherein the processor is configured to load and execute the instructions to:
determine a detection mode on the broadband spectrum;
determine a channel detection mechanism corresponding to the broadband spectrum based on at least one sub-band in the plurality of sub-bands in a case that the detection mode is a broadband detection mode; and
determine a channel detection mechanism corresponding to each sub-band based on the sub-band in the plurality of sub-bands in a case that the detection mode is a sub-band detection mode.

8. The wireless communication device of claim 7, wherein the channel detection mechanism comprises a contention window size, and different contention window sizes correspond to different channel access priorities; and
the processor is configured to: determine a contention window size with a lowest channel access priority among the contention window sizes corresponding to the plurality of sub-bands; and determine the contention window size with the lowest channel access priority as a contention window size in the channel detection mechanism corresponding to the broadband spectrum.

9. The wireless communication device of claim 7, wherein the channel detection mechanism comprises a contention window size, and
the processor is configured to determine the channel detection mechanism corresponding to each sub-band based on a contention window size corresponding to the sub-band.

10. The wireless communication device of claim 7, wherein each sub-band corresponds to a first contention window size and a second contention window size,
the first contention window size is a contention window size for a broadband detection mode; and
the second contention window size is a contention window size for a sub-band detection mode.

11. The wireless communication device of claim 7, wherein the processor is configured to perform at least one of:
determining the detection mode on the broadband spectrum automatically; and
receiving a first bandwidth part (BWP) switch command, and determining the detection mode on the broadband spectrum based on the first BWP switch command.

12. The wireless communication device of claim 7, wherein the processor is configured to:
generate a second bandwidth part (BWP)switch command, the second BWP switch command being configured to indicate the channel detection mechanism on the broadband spectrum; and
send the second BWP switch command to a terminal.

13. A non-transitory computer readable storage medium having at least one instruction, at least one program, a code set or an instruction set stored thereon, wherein the at least one instruction, the at least one program, the code set or the instruction set is loaded and executed by a processor to implement a method for determining a channel detection mechanism, the method is applied to a scene where a broadband spectrum on an unlicensed spectrum is employed for transmission, the broadband spectrum comprises a plurality of sub-bands, and the method comprises:
determining a detection mode on the broadband spectrum;
determining a channel detection mechanism corresponding to the broadband spectrum based on at least one sub-band in the plurality of sub-bands in a case that the detection mode is a broadband detection mode; and
determining a channel detection mechanism corresponding to each sub-band based on the sub-band in the plurality of sub-bands in a case that the detection mode is a sub-band detection mode.

14. The non-transitory computer readable storage medium of claim 13, wherein the channel detection mechanism comprises a contention window size, and different contention window sizes correspond to different channel access priorities; and
wherein determining the channel detection mechanism corresponding to the broadband spectrum based on the at least one sub-band in the plurality of sub-bands comprises:
determining a contention window size with a lowest channel access priority among the contention window sizes corresponding to the plurality of sub-bands; and determining the contention window size with the lowest channel access priority as a contention window size in the channel detection mechanism corresponding to the broadband spectrum.

15. The non-transitory computer readable storage medium of claim 13, wherein the channel detection mechanism comprises a contention window size, and wherein determining the channel detection mechanism corresponding to each sub-band based on the sub-band in the plurality of sub-bands comprises:

determining the channel detection mechanism corresponding to each sub-band based on a contention window size corresponding to the sub-band.

16. The non-transitory computer readable storage medium of claim 13, wherein each sub-band corresponds to a first contention window size and a second contention window size, the first contention window size is a contention window size for a broadband detection mode; and the second contention window size is a contention window size for a sub-band detection mode.

17. The non-transitory computer readable storage medium of claim 13, wherein determining the detection mode on the broadband spectrum comprises:

determining the detection mode on the broadband spectrum automatically; or receiving a first bandwidth part (BWP) switch command, and determining the detection mode on the broadband spectrum based on the first BWP switch command.

18. The non-transitory computer readable storage medium of claim 13, wherein the method further comprises:

generating a second bandwidth part (BWP)switch command, the second BWP switch command being configured to indicate the channel detection mechanism on the broadband spectrum; and sending the second BWP switch command to a terminal.

* * * * *